(12) United States Patent
Sano et al.

(10) Patent No.: US 8,489,272 B2
(45) Date of Patent: Jul. 16, 2013

(54) DIAGNOSTIC SYSTEM AND DIAGNOSTIC METHOD FOR VEHICLE

(75) Inventors: Tomoya Sano, Susono (JP); Koichi Ueda, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 263 days.

(21) Appl. No.: 13/130,727

(22) PCT Filed: Dec. 23, 2009

(86) PCT No.: PCT/IB2009/007874
§ 371 (c)(1),
(2), (4) Date: May 23, 2011

(87) PCT Pub. No.: WO2010/073111
PCT Pub. Date: Jul. 1, 2010

(65) Prior Publication Data
US 2011/0238255 A1 Sep. 29, 2011

(30) Foreign Application Priority Data

Dec. 25, 2008 (JP) .................................. 2008-329685
Mar. 23, 2009 (JP) .................................. 2009-070713

(51) Int. Cl.
*G06F 7/00* (2006.01)
*G06F 19/00* (2006.01)

(52) U.S. Cl.
USPC ......... 701/31.4; 701/103; 701/123; 180/54.1; 73/114.61; 340/438; 340/441

(58) Field of Classification Search
USPC ......... 701/29, 103–104, 101, 123; 73/114.01, 73/114.53, 114.61; 340/438, 441
See application file for complete search history.

(56) References Cited

U.S. PATENT DOCUMENTS 5,034,889 A * 7/1991 Abe .............................. 701/29.2
6,701,232 B2 * 3/2004 Yamaki ........................ 701/33.8

(Continued)

FOREIGN PATENT DOCUMENTS

CN      100385211 C  *  4/2008
DE    10 2006 055 4       5/2008

(Continued)

OTHER PUBLICATIONS

Experimental Characterisation of a Super-capacitor Based Electrical Torque Boost System for Down-sized ICE Vehicles; Wang, J. et al.; Vehicle Power and Propulsion Conference, 2006. VPPC '06. IEEE; Digital Object Identifier: 10.1109/VPPC.2006.364286 Publication Year: 2006 , pp. 1-6.*

(Continued)

*Primary Examiner* — Cuong H Nguyen
(74) *Attorney, Agent, or Firm* — Oblon, Spivak, McClelland, Maier & Neustadt, L.L.P.

(57) ABSTRACT

A diagnostic system for a vehicle driven by an internal combustion engine acquires a diagnostic driving pattern defined by a vehicle speed; stores a drive train model for calculating a torque and rotational speed of the internal combustion engine backward from a vehicle speed and an acceleration; stores map data in which a fuel consumption is associated with a torque and rotational speed of the internal combustion engine; updates the map data on the basis of a result of actual control over the internal combustion engine; uses the drive train model to calculate changes in torque and rotational speed of the internal combustion engine when the vehicle is caused to drive in accordance with the driving pattern; and uses the calculated changes in torque and rotational speed and the map data to calculate a fuel efficiency when the vehicle is caused to drive in accordance with the driving pattern.

17 Claims, 4 Drawing Sheets

U.S. PATENT DOCUMENTS

| | | | | |
|---|---|---|---|---|
| 6,975,217 | B2 * | 12/2005 | Endoh | 340/438 |
| 7,772,970 | B2 * | 8/2010 | Masuda et al. | 340/439 |
| 2002/0161495 | A1 * | 10/2002 | Yamaki | 701/33 |
| 2004/0008109 | A1 * | 1/2004 | Endoh | 340/450.2 |

FOREIGN PATENT DOCUMENTS

| | | | |
|---|---|---|---|
| EP | 1 253 415 | | 10/2002 |
| EP | 1253415 A2 | * | 10/2002 |
| GB | 2 125 578 | | 3/1984 |
| GB | 2 217 029 | | 10/1989 |
| GB | 2217029 B | * | 11/1992 |
| GB | 2 448 601 | | 10/2008 |
| JP | 63-077642 | * | 3/1988 |
| JP | 1 290967 | | 11/1989 |
| JP | 2001-130054 | * | 4/2001 |
| JP | 2001-127962 | * | 5/2001 |
| JP | 2002-202386 | * | 7/2002 |
| JP | 2003-278573 A | | 10/2003 |
| JP | 2004 60548 | | 2/2004 |
| JP | 2006-106147 | * | 4/2006 |
| JP | 2006 118480 | | 5/2006 |
| JP | 2006 183506 | | 7/2006 |
| JP | 2006-285114 | * | 10/2006 |

OTHER PUBLICATIONS

Application of PM type DMPM in hybrid electric vehicle; Wen Xuhui et al.; Energy Conversion Congress and Exposition (ECCE), 2010 IEEE; Digital Object Identifier: 10.1109/ECCE.2010.5617781; Publication Year: 2010 , pp. 3340-3344.*

Direct data-driven control of internal combustion engine test benches using closed-loop experiments;Passenbrunner, T. E. et al.; Decision and Control (CDC), 2012 IEEE 51st Annual Conference on; Digital Object Identifier: 10.1109/CDC.2012.6425955 Publication Year: 2012 , pp. 3765-3770.*

Influence to the electrical and mechanical sub system due to inverter control processes on a power train of electric vehicles Soukounis, C. et al., Power Engineering, Energy and Electrical Drives (POWERENG), 2011 International Conference on; Digital Object Identifier: 10.1109/PowerEng.2011.6036443; Publication Year: 2011 , pp. 1-6.*

Mechanical and electrical behaviour of an electric vehicles drive train due to the choice of the control-system Dost, P.; Sourkounis, C.; IECON 2011—37th Annual Conference on IEEE Industrial Electronics Society; Digital Object Identifier: 10.1109/IECON.2011.6119517; Publication Year: 2011 , pp. 1426-1431.*

Effects of the control-process-structure to the drivability in electric vehicles:Dost, P.; Sourkounis, C. Control & Automation (MED), 2011 19th Mediterranean Conference on; Digital Object Identifier: 10.1109/MED.2011.5983208 Publication Year: 2011 , pp. 365-370.*

International Search Report issued Apr. 29, 2010 in PCT/IB09/007874 filed Dec. 23, 2009.

* cited by examiner

DIAGNOSTIC SYSTEM AND DIAGNOSTIC METHOD FOR VEHICLE

BACKGROUND OF THE INVENTION

1. Field of the Invention

The invention relates to a diagnostic system and a diagnostic method for a vehicle that is driven by an internal combustion engine and, more particularly, to a system and a method that diagnoses the fuel efficiency of a vehicle.

2. Description of the Related Art

Various methods of calculating the fuel efficiency (that is, the relationship between a fuel consumption and a mileage) of a vehicle, particularly, a vehicle driven by an internal combustion engine, are suggested in Japanese Patent Application Publication No. 2006-183506 (JP-A-2006-183506), Japanese Patent Application Publication No. 2004-60548 (JP-A-2004-60548), Japanese Patent Application Publication No. 2006-118480 (JP-A-2006-118480), Japanese Patent Application Publication No. 1-290967 (JP-A-1-290967), and the like. For example, JP-A-2006-183506 describes a method of calculating the fuel efficiency on the basis of a fuel injection amount and a torque of the internal combustion engine. With the above method, the output of the internal combustion engine is computed on the basis of a torque and rotational speed of the internal combustion engine in a predetermined period of time, a total fuel supply amount in the predetermined period of time is computed, and then the fuel efficiency is computed on the basis of the relationship between the output of the internal combustion engine and the total fuel supply amount.

Incidentally, factors that influence the fuel efficiency of the vehicle include the service condition of the vehicle, the operating condition of a driver and the state of the vehicle itself. The method of calculating the fuel efficiency described in JP-A-2006-183506 is a method of calculating a comprehensive fuel efficiency that includes all of these factors.

However, when remedial measures for fuel efficiency are attempted to be taken on the basis of the results of calculation, the content of the remedial measures differs depending on whether the service condition of the vehicle or the operating condition of the driver influences the fuel efficiency or whether the state of the vehicle itself (for example, degradation of the internal combustion engine due to changes over time) influences the fuel efficiency. For example, when the fuel efficiency deteriorates because of the service condition of the vehicle or the operating condition of the driver, the fuel efficiency may be improved by reconsidering the service condition or changing the way of driving. In contrast, when the fuel efficiency deteriorates because of the state of the vehicle itself, it is necessary to inspect and maintain the vehicle for improvement in fuel efficiency, and there is a possibility that the fuel efficiency may not be improved so much depending on the progress of degradation of the vehicle. Thus, it is impossible to determine whether deterioration of the fuel efficiency depends on the service condition of the vehicle or the operating condition of the driver or depends on the state of the vehicle itself.

Note that, for example, JP-A-2004-60548 describes a method of calculating the fuel efficiency using a specific fuel consumption map that defines the relationship among a rotational speed of the internal combustion engine, a torque and a specific fuel consumption (g/(kW·h)). With the above method, a correction factor of a current specific fuel consumption with respect to an initial specific fuel consumption of the internal combustion engine is calculated on the basis of a mileage, and the correction factor of the specific fuel consumption is multiplied by values stored in the specific fuel consumption map to thereby correct the specific fuel consumption map. Then, a specific fuel consumption of the internal combustion engine is computed on the basis of the rotational speed and torque of the internal combustion engine by referring to the corrected specific fuel consumption map, and a fuel consumption of the internal combustion engine is computed on the basis of the computed specific fuel consumption.

SUMMARY OF THE INVENTION

The invention provides a diagnostic system and a diagnostic method for a vehicle, which is able to calculate a fuel efficiency that depends on the state of the vehicle itself by substantially eliminating the influences of the operating condition of a driver and the service condition of the vehicle on the fuel efficiency.

A first aspect of the invention relates to a diagnostic system for a vehicle that is driven by an internal combustion engine. The diagnostic system includes: a driving pattern acquisition unit that acquires a diagnostic driving pattern defined by a vehicle speed; a drive train model storage unit that stores a drive train model for calculating a torque and rotational speed of the internal combustion engine backward from a vehicle speed and an acceleration; a map data storage unit that stores map data in which a fuel consumption is associated with a torque and rotational speed of the internal combustion engine; a map data updating unit that updates the map data on the basis of a result of actual control over the internal combustion engine; and a fuel efficiency calculation unit that uses the drive train model to calculate changes in torque and rotational speed of the internal combustion engine when the vehicle is caused to drive in accordance with the driving pattern, and that uses the calculated changes in torque and rotational speed of the internal combustion engine and the map data to calculate a fuel efficiency when the vehicle is caused to drive in accordance with the driving pattern.

With the above diagnostic system, changes in torque and rotational speed of the internal combustion engine when the vehicle is caused to drive in the diagnostic driving pattern are calculated using the drive train model, and the calculated changes in torque and rotational speed of the internal combustion engine and the map data, in which a fuel consumption is associated with a torque and a rotational speed, are used to calculate a fuel efficiency. The thus calculated fuel efficiency is obtained when the vehicle is caused to drive in accordance with the diagnostic driving pattern under the predetermined condition defined by the drive train model, and substantially does not receive the influence of the service condition of the vehicle or the influence of the operating condition of the driver. In addition, the map data are updated on the basis of the result of actual control over the internal combustion engine, so the state of the vehicle itself, particularly, the state of the internal combustion engine, is reliably reflected on the result of calculation of the fuel efficiency. With the diagnostic system according to the first aspect, it is possible to calculate a fuel efficiency that depends on the state of the vehicle itself by substantially eliminating the influences of the operating condition of the driver and the service condition of the vehicle on the fuel efficiency, and it is possible to equitably diagnose the vehicle on the basis of the result of calculation.

In the diagnostic system, the drive train model storage unit may be configured so that, among coefficients or constants that constitute the drive train model, coefficients or constants associated with specifications of the vehicle are rewritable.

With the diagnostic system, by rewriting coefficients or constants associated with the specifications of the vehicle on the basis of the measured state of the vehicle, it is possible to further accurately calculate the fuel efficiency determined by the state of the vehicle itself.

In the diagnostic system, the map data updating unit may use respective actual values of the fuel consumption and the rotational speed and torque of the internal combustion engine to update the map data.

With the above diagnostic system, by using the respective actual values of the fuel consumption and the rotational speed and torque of the internal combustion engine for updating the map data, it is possible to reliably reflect the state of the internal combustion engine on the map data.

In the above diagnostic system, the map data updating unit may use respective actual values of the fuel consumption and the rotational speed of the internal combustion engine and a required torque to update the map data.

With the above diagnostic system, by using the respective actual values of the fuel consumption and the rotational speed of the internal combustion engine and the required torque for updating the map data, even when there is no means for measuring the torque, it is possible to reliably reflect the state of the internal combustion engine on the map data.

In the diagnostic system, the map data updating unit may use respective actual values of the fuel consumption and the rotational speed of the internal combustion engine and an estimated torque estimated from an operating state of the internal combustion engine to update the map data.

With the above diagnostic system, by using the respective actual values of the fuel consumption and the rotational speed of the internal combustion engine and the estimated torque estimated from the operating state of the internal combustion engine, even when there is no means for measuring the torque, it is possible to reliably reflect the state of the internal combustion engine on the map data.

In the diagnostic system, the map data updating unit may calculate the estimated torque from an in-cylinder pressure measured by an in-cylinder pressure sensor.

With the above diagnostic system, by using the in-cylinder pressure measured by the in-cylinder pressure sensor, it is possible to estimate the torque with high accuracy.

The diagnostic system may further include a warning unit that compares the fuel efficiency, calculated by the fuel efficiency calculation unit, with a predetermined reference value and that issues a warning when the calculated fuel efficiency is deteriorated with respect to the reference value.

With the above diagnostic system, a warning is issued when the fuel efficiency is deteriorated, so it is possible to prompt a driver or user of the vehicle to inspect and maintain the vehicle.

In the diagnostic system, the driving pattern may be defined by a vehicle speed and an acceleration. In the diagnostic system, the driving pattern may be regulated in a cruise mode for cruise driving, and may start calculation using the drive train model when a predetermined condition to perform cruise driving is satisfied. In the diagnostic system, the driving pattern may be a driving pattern regulated in a 10-15 mode of the Japan or a driving pattern regulated in LA#4 mode of the United States of America.

Incidentally, not a fuel efficiency for diagnosing the state of the vehicle but a fuel efficiency for evaluating the operating condition of the vehicle by a driver may be calculated by the method described in JP-A-2004-60548. The fuel efficiency varies not only depending on the operating condition of the vehicle by the driver but also when the state of the vehicle changes, such as when the internal combustion engine is deteriorated because of changes over time. In this case, the relationship between a rotational speed and torque of the internal combustion engine and a specific fuel consumption varies; however, that relationship is constant in the method described in JP-A-2004-60548. The specific fuel consumption is corrected by a correction factor depending on a mileage. However, the relationship between a mileage and a correction factor is constant, and an actual state of the vehicle is not reflected.

In order to diagnose the state of the vehicle, it is necessary to calculate a fuel efficiency that reflects the actual state of the vehicle, particularly, the actual state of the internal combustion engine. For the purpose of the above, it is important to, where necessary, update map data used for calculating the fuel efficiency; however, there is one problem.

First, the map data used for calculating the fuel efficiency is desirably configured so that a fuel consumption is associated with a torque and rotational speed of the internal combustion engine. However, the relationship of them varies depending on a value of an engine parameter used for control over the internal combustion engine. Among such engine parameters, an ignition timing is typical. When values of other engine parameters are constant, the torque is maximal when the ignition timing is a minimum advance for best torque (hereinafter, referred to as "MBT") and, as a result, the fuel efficiency is optimal. The internal combustion engine is controlled so as to achieve operation at MBT as much as possible. Thus, the map data are desirably configured so that a fuel consumption is associated with a torque and rotational speed of the internal combustion engine when the ignition timing is MBT. In addition, when the map data are based on that the ignition timing is MBT, the update timing of the map data is also desirably set at the time when the internal combustion engine is operated at MBT.

However, depending on the operating condition of the vehicle by the driver, the internal combustion engine is often operated at an ignition timing other than MBT. Therefore, if the update timing of the map data is limited to when the internal combustion engine is operated at MBT, there is a possibility that it is difficult to perform updating at sufficient frequency. When the frequency of update is low, it is difficult for the map data to sufficiently reflect the actual state of the internal combustion engine and, as a result, it is difficult to accurately perform diagnosis based on the fuel efficiency.

Then, the diagnostic system may further include: a torque characteristic model storage unit that stores a torque characteristic model that represents the relationship between a specific engine parameter used in control over the internal combustion engine and a torque of the internal combustion engine; a data acquisition unit that acquires respective values of the fuel consumption and the torque and rotational speed of the internal combustion engine and a value of the specific engine parameter at an update timing at which the map data are updated; and an updating torque value generating unit that, when the acquired value of the specific engine parameter differs from a specific value, uses the torque characteristic model to generate an updating value of the torque, corresponding to the specific value, from the acquired value of the torque, wherein the map data updating unit may update a value of the fuel consumption of the map data, corresponding to the acquired value or generated updating value of the torque and the acquired value of the rotational speed of the internal combustion engine, to the acquired value of the fuel consumption.

With the above diagnostic system, respective values of the fuel consumption and the torque and rotational speed of the internal combustion engine and a value of the specific engine parameter are acquired at an update timing at which the map data are updated. Then, the value of the of the fuel consumption of the map data, corresponding to the acquired value of the torque and the acquired value of the engine rotational speed, is updated to the acquired value of the fuel consumption. In addition, when the acquired value of the specific engine parameter differs from a specific value, a torque characteristic model that represents the relationship between a specific engine parameter and a torque of the internal combustion engine is used to generate an updating value of torque, corresponding to the specific value, from the acquired value of the torque. Then, a value of the fuel consumption of the map data, corresponding to the generated updating value of the torque and the acquired value of the engine rotational speed, is updated to the acquired value of the fuel consumption. In this way, with the diagnostic system, irrespective of whether the value of the specific engine parameter is the specific value, it is possible to update the map data each time the update timing of the map data comes. Thus, it is possible to sufficiently reflect the actual state of the internal combustion engine on the result of calculation of the fuel efficiency by efficiently updating the map data.

In the diagnostic system, when the acquired value of the specific engine parameter coincides with the specific value, the map data updating unit may update a value of the fuel consumption of the map data, corresponding to the acquired value of the torque and the acquired value of the rotational speed of the internal combustion engine, to the acquired value of the fuel consumption, and, when the acquired value of the specific engine parameter differs from the specific value, the map data updating unit may update a value of the fuel consumption of the map data, corresponding to the generated updating value of the torque and the acquired value of the rotational speed of the internal combustion engine, to the acquired value of the fuel consumption.

In the diagnostic system, the specific engine parameter may be an ignition timing, and the specific value is a minimum advance for best torque (hereinafter, referred to as "MBT").

With the above diagnostic system, it is possible to calculate a maximum fuel efficiency that is achieved when the internal combustion engine is operated at MBT, so it is possible to diagnose the vehicle equitably in terms of fuel efficiency. In addition, the map data are based on that the ignition timing is MBT. However, even when data are acquired when the internal combustion engine is operated at an ignition timing other than MBT, the data may be used for updating the map data, so the update timing of the map data is not limited to when the internal combustion engine is operated at MBT.

In the diagnostic system, the specific engine parameter may be an air-fuel ratio, and the specific value may be a stoichiometric air-fuel ratio. In the diagnostic system, the specific engine parameter may be at least one of a fuel injection timing for a direct-injection engine, an EGR rate and a valve timing.

In the diagnostic system, when a plurality of values of the fuel consumption, corresponding to the same values of the torque and rotational speed of the internal combustion engine, are acquired, the map data updating unit may update the value of the fuel consumption of the map data to a mean value of the plurality of values of the fuel consumption.

With the above diagnostic system, a plurality of values of the fuel consumption, corresponding to the same values of the torque and rotational speed of the internal combustion engine, are acquired, and the value of the fuel consumption of the map data is updated to a mean value of the plurality of values of the fuel consumption. Thus, it is possible to improve the accuracy of update by reducing the influence of noise included in the acquired data.

A second aspect of the invention relates to a diagnostic method for a vehicle that is driven by an internal combustion engine. The diagnostic method includes: acquiring a diagnostic driving pattern defined by a vehicle speed; storing a drive train model for calculating a torque and rotational speed of the internal combustion engine backward from a vehicle speed and an acceleration; storing map data in which a fuel consumption is associated with a torque and rotational speed of the internal combustion engine; updating the map data on the basis of a result of actual control over the internal combustion engine; calculating changes in torque and rotational speed of the internal combustion engine when the vehicle is caused to drive in accordance with the driving pattern using the drive train model; and calculating a fuel efficiency when the vehicle is caused to drive in accordance with the driving pattern using the calculated changes in torque and rotational speed of the internal combustion engine, and the map data.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
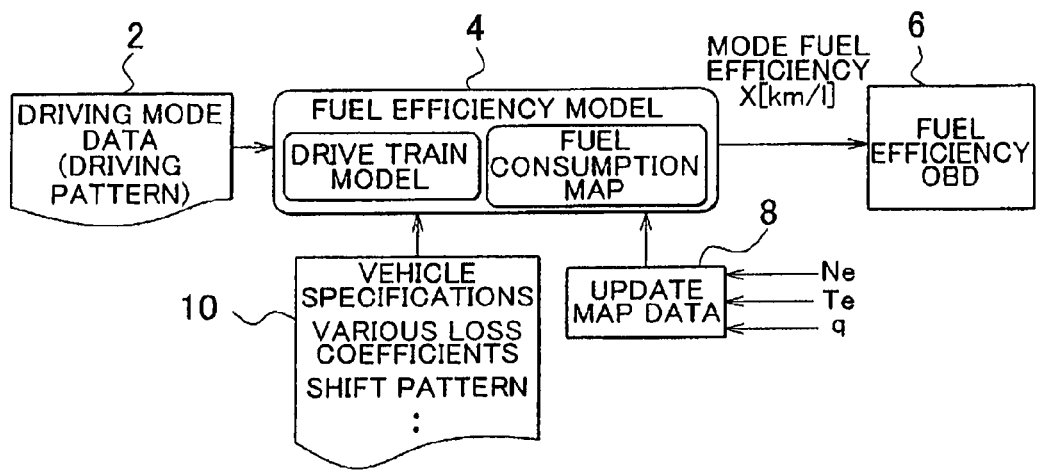
FIG. 1 is a schematic view that shows an example of the configuration of a diagnostic system of a vehicle according to a first embodiment of the invention.

Hereinafter, a first embodiment of the invention will be described with reference to FIG. 1 to FIG. 5.
First Embodiment
A vehicle or a diagnostic target in the first embodiment is a vehicle that is driven by an internal combustion engine (hereinafter, simply referred to as engine). The vehicle includes a manual transmission or an electromagnetic clutch-type automatic transmission in a drive train. The type of the engine is not limited. A diagnostic system according to the present embodiment is implemented as one of functions of a controller provided for the vehicle. FIG. 1 shows a block diagram of the configuration of the case where the controller of the vehicle functions as the diagnostic system. The configuration shown in FIG. 1 is virtually implemented in such a manner that a CPU of the controller operates in accordance with a program stored in a memory of the controller.

Figure 2:
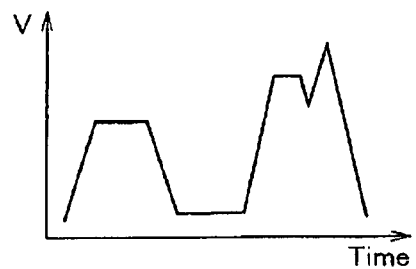
FIG. 2 is a graph that shows an example of a diagnostic driving pattern according to the first embodiment of the invention.

As shown in FIG. 1, the diagnostic system is formed of five elements 2, 4, 6, 8 and 10. One of the elements that constitute the diagnostic system is a driving mode data storage unit 2 that stores diagnostic driving mode data. The driving mode data define a diagnostic driving pattern by a vehicle speed V. When the driving mode data are expressed in graph, the driving mode data are shown in FIG. 2. The diagnostic driving pattern may be defined by an acceleration, or the like, other than the vehicle speed V. A specific example of the driving pattern may be a driving pattern regulated in a 10-15 mode or a driving pattern regulated in LA#4 mode of the United States of America. The driving mode data stored in the driving mode data storage unit 2 is externally rewritable. That is, the driving mode data storage unit 2 is able to externally acquire the driving mode data. Note that a predetermined driving pattern (for example, cruise mode) may be input by a driver to measure the fuel efficiency. In addition, the memory may prestore a program that automatically executes diagnosis when a predetermined operating mode, such as automatic cruise, is detected.

Figure 3:
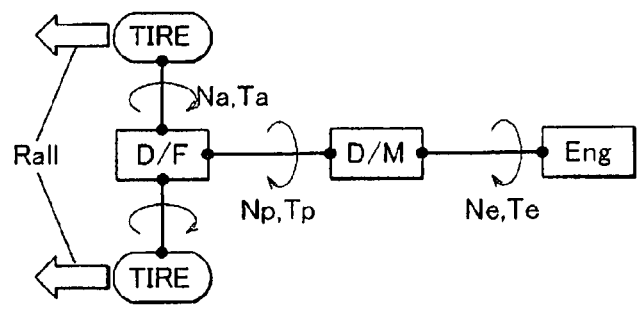
FIG. 3 is a conceptual view of a drive train model according to the first embodiment of the invention.

The elements of the diagnostic system include a fuel efficiency calculation unit 4. The fuel efficiency calculation unit 4 calculates the fuel efficiency (that is, the relationship between a fuel consumption and a mileage) of the vehicle using the fuel efficiency model. The fuel efficiency model is a calculation model for calculating the fuel efficiency from the driving mode data. Hereinafter, the fuel efficiency calculated using the fuel efficiency model is termed a mode fuel efficiency X [km/l]. The fuel efficiency model is formed of a drive train model and a fuel consumption map, and is stored in the diagnostic system. FIG. 3 is a conceptual view of the drive train model. As shown in the drawing, the drive train model models the transmission characteristic of torque and rotation from the engine to tires (drive wheels). By calculating the drive train model in the reverse direction, the engine rotational speed Ne and the engine torque Te may be calculated backward from the driving mode data. That is, it is possible to calculate the engine rotational speed Ne and the engine torque Te on the basis of the characteristic of torque and rotation of each drive wheel. A fuel consumption q [g/s] in the engine is associated with the engine rotational speed Ne [rpm] and the engine torque (that is, the torque of the rotary shaft of the engine) Te [Nm] in the fuel consumption map. A method of calculating a mode fuel efficiency X using the drive train model and the fuel consumption map will be described in detail later.

The elements of the diagnostic system include a fuel efficiency OBD unit 6. The fuel efficiency OBD unit 6 executes fuel efficiency diagnosis of the mode fuel efficiency X calculated using the fuel, efficiency model. Then, on the basis of the result of the fuel efficiency diagnosis, a warning lamp (not shown) in a vehicle cabin is used to warn a driver or a user. A method of executing fuel efficiency diagnosis by the diagnostic system will be described in detail later.

In addition, the elements of the diagnostic system include a map data updating unit 8. The map data updating unit 8 learns the relationship among an engine rotational speed, an engine torque and a fuel consumption on the basis of the results of actual control over the engine, and updates the fuel consumption map on the basis of the results of learning at a predetermined interval. However, learning is performed by the map data updating unit 8 only when the engine is in a normally controlled state. The normally controlled state means a state where no special control, such as catalyst warm-up operation at the time of cold start and rich spike control for catalyst regeneration, is performed. Information used for learning is an actual value measured by a crank angle sensor for the engine rotational speed, and is an actual value calculated from a fuel injection amount for the fuel consumption. When the engine is equipped with a torque sensor, an actual value measured by the torque sensor for the engine torque may be used as information for learning. In the engine equipped with no torque sensor, if an in-cylinder sensor (CPS) is provided for any of cylinders, an estimated torque calculated on the basis of an in-cylinder pressure may be used as information for learning. In addition, in the engine equipped with neither a torque sensor nor an in-cylinder pressure sensor, an estimated torque calculated on the basis of an intake air flow rate, an ignition timing and an air-fuel ratio may be used as information for learning or a required torque (that is, a torque required by a driver of the vehicle) calculated from an accelerator operation amount, or the like, may be used as information for learning. Note that updating based on the results of actual control over the engine will be described in detail in a second embodiment.

Furthermore, the elements of the diagnostic system include a model data input unit 10. Various pieces of data that constitute the drive train model, specifically, data of vehicle specifications such as vehicle weight and tire diameter, various loss coefficients such as rolling friction coefficient, a shift pattern of the transmission, and the like, may be input from the model data input unit 10. For example, when the tire diameter and/or rolling friction coefficient change because of tire replacement, data of the drive train model are also rewritten to update the drive train model to the latest one according to an actual vehicle.

Figure 4:
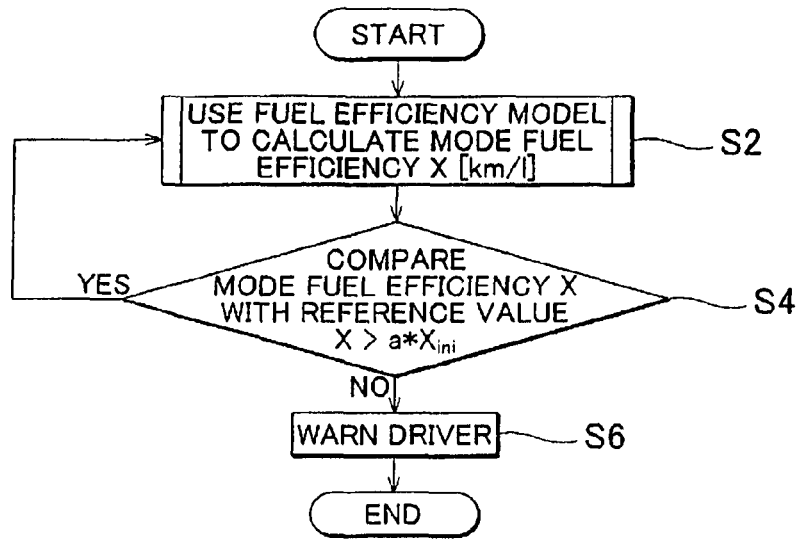
FIG. 4 is a flowchart that shows the procedure of fuel efficiency diagnosis executed in the first embodiment of the invention.

Next, the procedure of fuel efficiency diagnosis executed by the diagnostic system according to the first embodiment will be described with reference to the flowchart shown in FIG. 4. As shown in FIG. 4, in the first step S2 of the fuel efficiency diagnosis, the fuel efficiency calculation unit 4 calculates the mode fuel efficiency X using the fuel efficiency model. The process of this step is executed at a relatively long predetermined interval, or a predetermined timing such as a timing at which the engine is started. A specific procedure of fuel efficiency calculation using the fuel efficiency model will be described later.

In the next step S4, the fuel efficiency OBD unit 6 makes a determination. The fuel efficiency OBD unit 6 determines whether the mode fuel efficiency X calculated by the fuel efficiency calculation unit 4 satisfies the relationship expressed by the following inequality.

$$X > d \cdot X_{ini}$$

$X_{ini}$ is a reference value, and is a catalog value or a measured value at the time of a new vehicle. The coefficient d is smaller than 1. The value of d is set at a value at which it may be determined that there is no problem on the vehicle itself in terms of fuel efficiency at least when the above relationship (inequality) is satisfied.

When the above relationship is satisfied (YES in step S4), the process of step S2 and the determination of step S4 are repeated.

When the above relationship is not satisfied (NO in Step S4), that is, when the mode fuel efficiency X exceeds an allowable value and is deteriorated, the fuel efficiency OBD unit 6 executes the process of step S6. The fuel efficiency OBD unit 6 lights up or blinks a warning lamp in the vehicle cabin, for example, on an instrument panel, to warn the driver.

As will be described below, the mode fuel efficiency X calculated using the fuel efficiency model is a fuel efficiency determined depending on the state of the vehicle itself, and is an equitable index for evaluating fuel efficiency, which is less likely to receive the influence of the service condition of the vehicle and the operating condition of the driver. Thus, deterioration of the mode fuel efficiency X means that there is a possibility that a problem has occurred in the vehicle. In the diagnostic system according to the first embodiment, when it is determined that the mode fuel efficiency X is deteriorated as a result of fuel efficiency diagnosis, the fuel efficiency OBD unit 6 issues a warning. Thus, it is possible to prompt the driver to inspect and maintain the vehicle.

Figure 5:
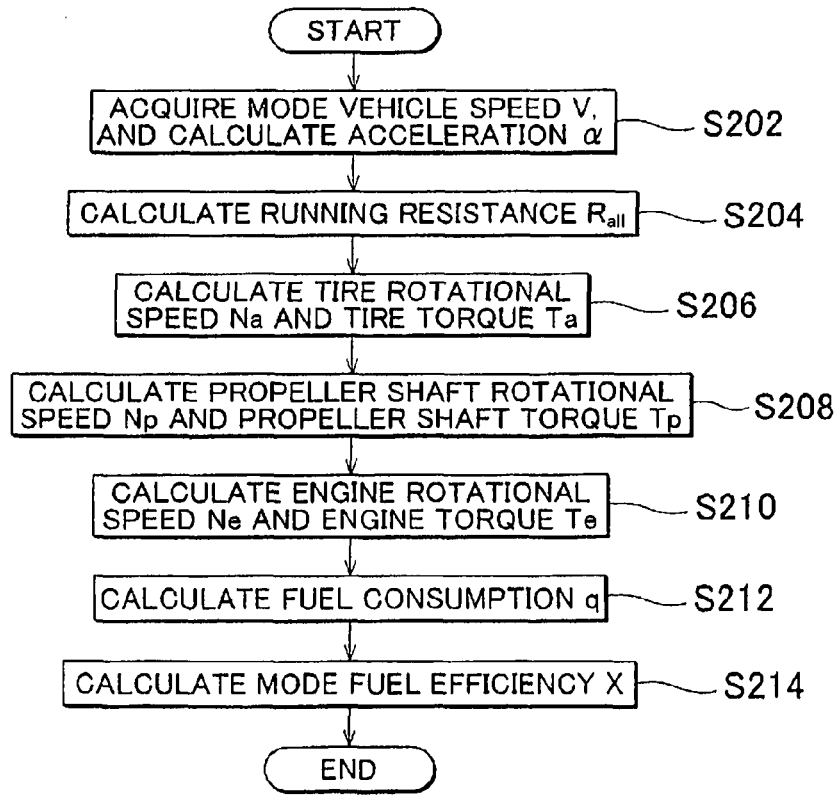
FIG. 5 is a flowchart that shows the procedure of fuel efficiency calculation executed in the first embodiment of the invention.

FIG. 5 is a flowchart that shows the procedure of fuel efficiency calculation executed by the fuel efficiency calculation unit 4 in step S2. As shown in FIG. 5, the process of step S2 includes the processes from step S202 to step S214. As described above, the fuel efficiency model is formed of the drive train model and the fuel consumption map. The processes from step S202 to step S210 correspond to computation by the drive train model. The fuel consumption map is used in the process of step S212.

In the first step S202 of the fuel efficiency calculation, the driving mode data stored in the driving mode data storage unit 2 are loaded onto the fuel efficiency calculation unit 4. The fuel efficiency calculation unit 4 acquires the vehicle speed V [m/s] from the driving mode data, and calculates an acceleration $\alpha$ [m/s$^2$] on the basis of the vehicle speed V. Specifically, from the start to the end of the driving pattern regulated by the driving mode data, a vehicle speed V is acquired at a predetermined time interval (for example, an interval of 1 second). Then, an acceleration $\alpha$ [m/s$^2$] is calculated on the basis of the acquired vehicle speed V and the above time interval.

In the next step S204, the fuel efficiency calculation unit 4 calculates a running resistance $R_{all}$ [N] on the basis of the vehicle speed V and the acceleration $\alpha$. The running resistance $R_{all}$ may be calculated by the sum of an air resistance $R_{air}$ and a rolling resistance $R_{roll}$ as shown by the following equation.

$$R_{all} = R_{air} + R_{roll}$$

The resistances $R_{air}$ and $R_{roll}$ are calculated using a map that is empirically prepared in advance or using a physical equation. Those maps and physical equation constitute part of the drive train model. In addition, among coefficients and constants used in calculation, constants that can vary depending on the state of the vehicle, such as vehicle weight and the rolling friction coefficient of each tire, are rewritable through the model data input unit 10.

In the next step S206, the fuel efficiency calculation unit 4 uses the following equations to calculate a tire rotational speed Na [rpm] on the basis of the vehicle speed V and calculate a tire torque Ta [Nm] on the basis of the running resistance $R_{all}$. Here, R is the effective radius of the tire, and is also rewritable through the model data input unit 10.

$$Na = V/(2 \cdot \pi \cdot R)$$

$$Ta = R_{all} \cdot R$$

In the next step S208, the fuel efficiency calculation unit 4 uses the following equations to calculate a propeller shaft rotational speed Np [rpm] on the basis of the tire rotational speed Na and calculate a propeller shaft torque Tp [Nm] on the basis of the tire torque Ta. Here, $i_D$ is a differential ratio of a differential gear (indicated by "D/F" in FIG. 3), and $\Delta T_D$ is a torque loss in the differential gear. A value of $\Delta T_D$ is calculated using a physical equation or using a map that is empirically prepared in advance.

$$Np = Na \cdot i_D$$

$$Tp = Ta/i_D + \Delta T_D$$

In the next step S210, the fuel efficiency calculation unit 4 uses the following equations to calculate an engine rotational speed Ne [rpm] on the basis of the propeller shaft rotational speed Np and calculate an engine torque Te [Nm] on the basis of the propeller shaft torque Tp.

$$Ne = N_p \cdot i_M$$

$$Te = Tp/i_M + \Delta T_M + \Delta T_E + I_E \cdot i_D \cdot i_M \cdot \alpha/R$$

Here, $i_M$ is a gear ratio of the transmission (indicated by "T/M" in FIG. 3), and $I_E$ is an engine inertia moment. In the first embodiment, the transmission is a manual transmission. A value of the gear ratio $i_M$ is determined in accordance with a predetermined shift pattern. The shift pattern is a shift pattern used in control over the transmission when the transmission is an electromagnetic clutch automatic transmission, and is a virtual shift pattern that may be considered to be optimal in terms of fuel efficiency when the transmission is a manual transmission. The shift pattern also constitutes part of the drive train model. $\Delta T_M$ is a torque loss in the transmission. $\Delta T_E$ is a torque loss in the engine (Eng in FIG. 3). Respective values of $\Delta T_E$ and $\Delta T_M$ are calculated using physical equations or using maps that are empirically prepared in advance.

Through the processes from step S202 to step S210, the engine torque Te and the engine rotational speed Ne at the time when the vehicle is driven in the driving pattern regulated in the driving mode data each are calculated at a predetermined time interval. In the next step S212, the fuel efficiency calculation unit 4 applies the results of calculation in step S210 to the fuel consumption map, and calculates the fuel consumption q [g/s] at a predetermined time interval (here, an interval of 1 second) from the start to end of the driving pattern regulated in the driving mode data.

In the last step S214, the fuel efficiency calculation unit 4 calculates the mode fuel efficiency X using the time integration of the vehicle speed V and the time integration of the fuel consumption q as expressed by the following equation.

$$X = \rho \cdot \int V dt / \int q dt \times 10^3$$

The integration interval of each time integration ranges from the start point to end point of the driving pattern regulated in the driving mode data. $\rho$ in the above equation is a fuel density.

As described above, in the diagnostic system according to the first embodiment, changes in engine torque and engine rotational speed when the vehicle is driven in the diagnostic driving pattern are calculated using the drive train model, and then the results of calculation and the fuel consumption map are used to calculate the mode fuel efficiency of the vehicle. The mode fuel efficiency calculated by the diagnostic system according to the first embodiment is a fuel efficiency when the vehicle is driven in the diagnostic driving pattern under the predetermined condition defined by the drive train model, so the influences of the service condition of the vehicle and the operating condition of the driver on the fuel efficiency are suppressed. In addition, the data of the fuel consumption map are updated by the map data updating unit 8 on the basis of the results of actual control over the engine, so the state of the vehicle itself, particularly the state of the engine, is reliably reflected on the results of calculation of the mode fuel efficiency. Note that updating based on the results of actual control over the engine will be described in detail in the second embodiment.

The first embodiment of the invention is described above; however, the aspect of the invention is not limited to the above described first embodiment. The aspect of the invention may be modified into various forms without departing from the scope of the invention.

First Alternative Embodiment

For example, the aspect of the invention may be applied to a vehicle equipped with a torque converter automatic transmission. In this case, it is only necessary that the process of step S210 in the flowchart shown in FIG. 5 is replaced with the processes of steps S220, S222, S224 and S226 in the flowchart shown in FIG. 6.

Figure 6:
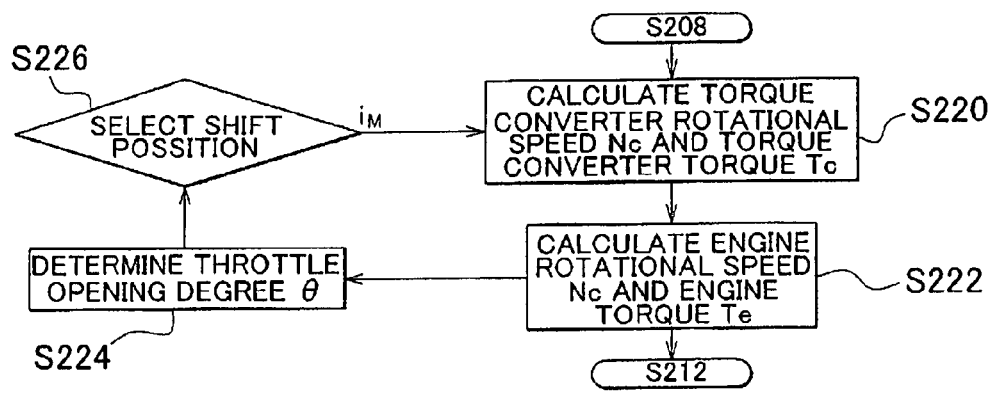
FIG. 6 is a flowchart that shows part of the procedure of fuel efficiency calculation according to a first alternative embodiment to the first embodiment of the invention, in which a vehicle is equipped with a torque converter automatic transmission.

The flowchart of FIG. 6 will be described. In step S220, a torque converter rotational speed Nc and a torque converter torque Tc are calculated on the basis of the propeller shaft rotational speed Np and the propeller shaft torque Tp. A torque converter model that models the transmission characteristic of a torque converter using a physical equation, an empirical formula or a map for the above calculation. In step S222, an engine rotational speed Ne and an engine torque Te are calculated from the torque converter rotational speed Nc and the torque converter torque Tc.

The gear ratio $i_M$ of the transmission is required for calculating the torque converter rotational speed Nc and the torque converter torque Tc, and the gear ratio $i_M$ is determined on the basis of a shift position. The shift position is selected in step S226. In step S226, a shift position is selected by referring to a shift line map on the basis of a throttle opening degree θ calculated in step 5224. In step S224, the throttle opening degree θ is determined on the basis of the engine rotational speed Ne and the engine torque Te calculated in step 5222 by referring to a map prepared in advance.

Hereinafter, the second embodiment of the invention will be described with reference to FIG. 7 to FIG. 10.

Second Embodiment

Figure 7:
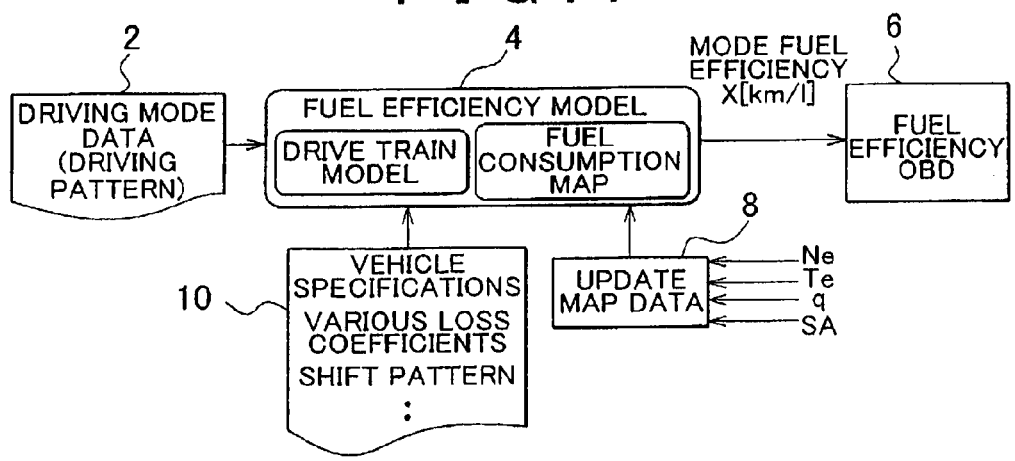
FIG. 7 is a schematic view that shows the configuration of a diagnostic system for a vehicle according to a second embodiment of the invention.

A vehicle or a diagnostic target in the second embodiment is a vehicle that is driven by an internal combustion engine (hereinafter, simply referred to as engine). The engine equipped for the vehicle is a spark ignition engine of which an air-fuel ratio is controlled to a stoichiometric air-fuel ratio. The other engine specifications are not limited. The diagnostic system according to the second embodiment is implemented as one of functions of a controller provided for the vehicle. FIG. 7 shows a block diagram of the configuration of the case where the controller of the vehicle functions as the diagnostic system. The configuration shown in FIG. 7 is virtually implemented in such a manner that a CPU of the controller operates in accordance with a program stored in a memory of the controller. Hereinafter, like reference numerals denote similar components to those of the first embodiment, and the description that overlaps the first embodiment is omitted.

Figure 8:
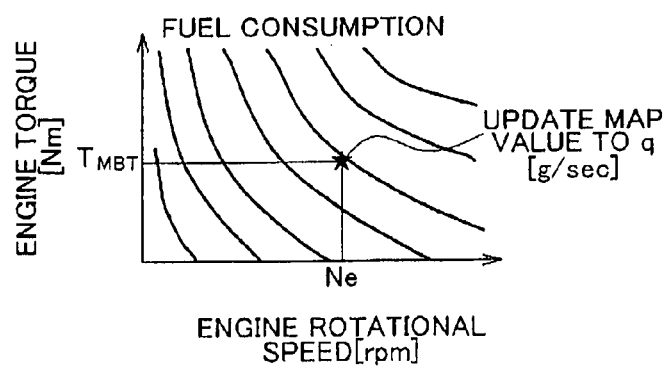
FIG. 8 is a conceptual view of a fuel consumption map according to the second embodiment of the invention.

FIG. 8 is a conceptual view of a fuel consumption map. As shown in the drawing, the map data updating unit 8 according to the second embodiment acquires an engine rotational speed Ne and an MBT torque $T_{MBT}$ of the engine, and updates the value of the fuel consumption specified by those engine rotational speed Ne and MBT torque $T_{MBT}$ to a currently acquired value q. The MBT torque is a torque that is output from the engine when the ignition timing is a minimum advance for best torque (hereinafter, referred to as "MBT"). With respect to the same engine rotational speed and fuel consumption, the torque is maximal when the ignition timing is MBT and, as a result, the fuel efficiency is also optimal. Thus, in the fuel consumption map shown in FIG. 8, the fuel consumption is associated with the torque and rotational speed of the engine when the ignition timing is MBT.

The map data updating unit 8 acquires data used for updating the fuel consumption map from the results of actual control over the engine. However, the engine is not necessarily operated at MBT. In terms of the fuel efficiency, the engine is desirably operated at MBT as much as possible; however, actually, the engine is often operated at an ignition timing other than MBT. Therefore, if the update timing of the fuel consumption map is limited to when the ignition timing is MBT, it is difficult to perform updating at sufficient frequency.

Then, the map data updating unit 8 according to the second embodiment, at an ignition timing other than MBT, converts the acquired engine torque Te to MBT torque, and updates the fuel consumption map using the converted MBT torque. A torque characteristic model is used for the above conversion. The torque characteristic model used in the second embodiment is a statistical model in which the relationship between an ignition timing and a torque is expressed by a mathematical expression. When the engine rotational speed is constant, the statistical model may be expressed by the following mathematical expression.

$$F(SA)=a*SA^2+b*SA+c$$

In the above mathematical expression, a, b and c are constants and are empirically determined. The statistical model shown by the above mathematical expression prepared for each engine rotational speed may be regarded as the torque characteristic model according to the second embodiment.

Figure 9:
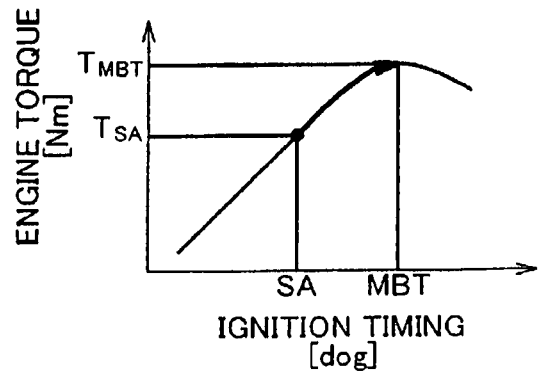
FIG. 9 is a conceptual view of a torque characteristic model according to the second embodiment of the invention.

The torque characteristic model is stored in the map data updating unit 8. FIG. 9 is a conceptual view of the torque characteristic model stored in the map data updating unit 8. The torque curve shown in FIG. 9 is the torque characteristic model. As shown in FIG. 9, it is assumed that the ignition timing acquired at the update timing of the fuel consumption map is SA, and the torque at that time is $T_{SA}$. In addition, it is assumed that the fuel consumption at that time is q. Then, it is assumed that, on the torque curve specified by the ignition timing SA and the torque $T_{SA}$, a torque at MBT is $T_{MBT}$. The second embodiment is based on stoichiometric operation, so the value of fuel consumption is the same at anywhere on the torque curve. The fuel consumption q required to generate the torque $T_{SA}$ at the ignition timing SA is equal to the fuel consumption required to generate the torque $T_{MBT}$ at MBT. The map data updating unit 8 updates the value of fuel consumption specified by the engine rotational speed Ne and the torque $T_{MBT}$ to the currently acquired value q.

However, learning is performed by the map data updating unit 8 only when the engine is in a normally controlled state. The normally controlled state means a state where no special control is performed. Here, the special control means a control in which the above described torque characteristic model cannot be used for representing the relationship between an ignition timing and a torque. For example, the special control includes rich operation and lean operation that actively shift the air-fuel ratio from a stoichiometric air-fuel ratio. In addition, the special control also includes a control that fixes the valve timing at a specific position and that is executed at the time of cold start. This is because the torque characteristic model is based on that the valve timing is controlled depending on circumstances. In addition, the special control further includes catalyst warm-up operation that intentionally retards the ignition timing by a large amount.

Figure 10:
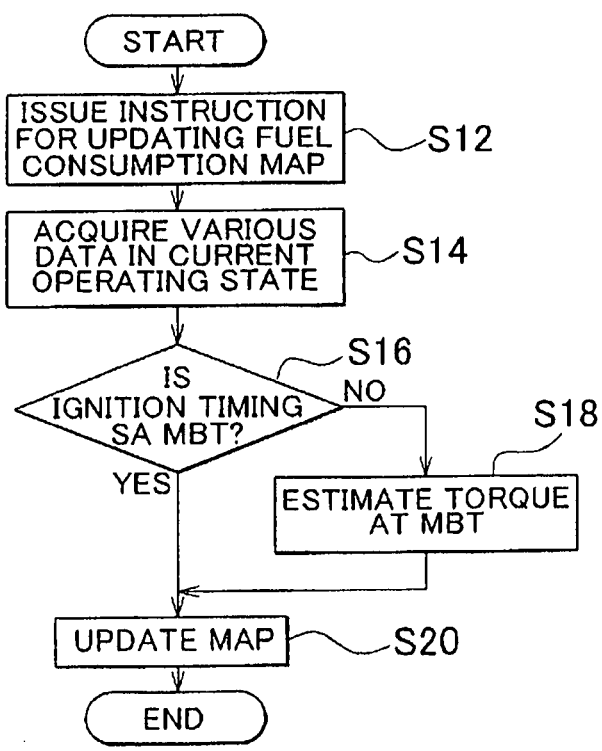
FIG. 10 is a flowchart that shows the procedure of updating the fuel consumption map executed in the second embodiment of the invention.

FIG. 10 is a flowchart that shows the procedure of updating the above described fuel consumption map. In the first step S12 of the fuel efficiency diagnosis, at the update timing at which the fuel consumption map is updated, the map data updating unit 8 is instructed to update the fuel consumption map. The update timing may be set at the time at which the vehicle travels a predetermined distance from the previous update. Alternatively, the update timing may be set at the time at which a predetermined period of time has elapsed from the previous update.

In the next step S14, various pieces of data in the current operating state are acquired. Here, the acquired data are the engine rotational speed Ne, the ignition timing SA, the engine torque Te and the fuel consumption q. When the engine is equipped with a torque sensor, an actual value measured by the torque sensor is acquired as the engine torque Te. In the engine equipped with no torque sensor, if an in-cylinder sensor is provided for any of cylinders, an estimated torque calculated on the basis of an in-cylinder pressure may be acquired.

In the next step S16, it is determined whether the current ignition timing SA is MBT. When the current ignition timing SA is MBT, the process proceeds to step S20. In step S20, the value of fuel consumption specified by the current engine rotational speed Ne and engine torque Te on the fuel consumption map is updated to the currently acquired value q.

When the current ignition timing is not MBT, the process proceeds to step S20 via the process of step S18. In step S18, the torque characteristic model is used to estimate the torque $T_{MBT}$ at MBT. In the subsequent step S20, the value of fuel consumption specified by the current engine rotational speed Ne and the estimated MBT torque $T_{IMBT}$ on the fuel consumption map is updated to the currently acquired value q.

As described above, with the diagnostic system according to the second embodiment, irrespective of whether the ignition timing is MBT, the fuel consumption map may be updated each time the update timing of the fuel consumption map comes.

Thus, the update timing of the fuel consumption map is not limited to the time when the engine is operated at MBT, and efficient update of the fuel consumption map makes it possible to sufficiently reflect the actual state of the engine on the results of calculation of the fuel efficiency.

The second embodiment of the invention is described above; however, the aspect of the invention is not limited to the above second embodiment. The aspect of the invention may be modified into various forms without departing from the scope of the invention. For example, the aspect of the invention may be modified into the following alternative embodiments.

Second Alternative Embodiment

In the above second embodiment, the fuel consumption map is updated on the basis of a single set of fuel consumption data that are acquired at the time when an update instruction is issued. Actually, there are variations in actually measured value of the fuel consumption, so there is a possibility that an error is included if update is performed using a single set of fuel consumption data. Therefore, desirably, the value of the acquired fuel consumption is stored in association with the values of the engine torque and engine rotational speed. Then, desirably, when a predetermined number (for example, 10) of values of the fuel consumption corresponding to the same engine torque and engine rotational speed are acquired, the fuel consumption map is updated by the mean value of the predetermined number of fuel consumption data. By so doing, it is possible to reduce the influence of noise included in the acquired data to improve the accuracy of update of the fuel consumption map.

Third Alternative Embodiment

In addition, in the above second embodiment, the torque characteristic mode that represents the relationship between an ignition timing and an engine torque is used. This is an example of the torque characteristic map according to the aspect of the invention, that is, an example of the torque characteristic map that represents the relationship between a specific engine parameter, used in control over the engine, and an engine torque. The specific engine parameter is not limited to ignition timing. An air-fuel ratio, a fuel injection timing for a direct-injection engine, an EGR rate, a valve timing, or the like, may be used as the specific engine parameter, or all of them may be used as the specific engine parameters. For example, when the specific engine parameter is an air-fuel ratio, a stoichiometric air-fuel ratio may be set as a specific value like MBT in the second embodiment. In this case, when a current air-fuel ratio differs from a stoichiometric air-fuel ratio, the torque characteristic mode that represents an air-fuel ratio and a torque is used to make it possible to calculate the value of an updating torque corresponding to the stoichiometric air-fuel ratio from the acquired value of the torque.

The invention claimed is:

1. A diagnostic system for a vehicle that is driven by an internal combustion engine, comprising:
    a driving pattern acquisition unit that acquires a diagnostic driving pattern defined by a vehicle speed;
    a drive train model storage unit that stores a drive train model for calculating a torque and rotational speed of the internal combustion engine backward from a vehicle speed and an acceleration;
    a map data storage unit that stores map data in which a fuel consumption is associated with a torque and rotational speed of the internal combustion engine;
    a map data updating unit that updates the map data on the basis of a result of actual control over the internal combustion engine; and
    a fuel efficiency calculation unit that uses the drive train model to calculate changes in torque and rotational speed of the internal combustion engine when the vehicle is caused to drive in accordance with the driving pattern, and that uses the calculated changes in torque and rotational speed of the internal combustion engine and the map data to calculate a fuel efficiency when the vehicle is caused to drive in accordance with the driving pattern.

2. The diagnostic system according to claim 1, wherein the drive train model storage unit is configured so that, among coefficients or constants that constitute the drive train model, coefficients or constants associated with specifications of the vehicle are rewritable.

3. The diagnostic system according to claim 1, wherein the map data updating unit uses respective actual values of the fuel consumption and the rotational speed and torque of the internal combustion engine to update the map data.

4. The diagnostic system according to claim 1, wherein the map data updating unit uses respective actual values of the fuel consumption and the rotational speed of the internal combustion engine and a required torque to update the map data.

5. The diagnostic system according to claim 1, wherein the map data updating unit uses respective actual values of the fuel consumption and the rotational speed of the internal combustion engine and an estimated torque estimated from an operating state of the internal combustion engine to update the map data.

6. The diagnostic system according to claim 5, wherein the map data updating unit calculates the estimated torque from an in-cylinder pressure measured by an in-cylinder pressure sensor.

7. The diagnostic system according to claim 1, further comprising:
a warning unit that compares the fuel efficiency, calculated by the fuel efficiency calculation unit, with a predetermined reference value and that issues a warning when the calculated fuel efficiency is deteriorated with respect to the reference value.

8. The diagnostic system according to claim 1, wherein the driving pattern is defined by a vehicle speed and an acceleration.

9. The diagnostic system according to claim 1, wherein the driving pattern is regulated in a cruise mode for cruise driving, and starts calculation using the drive train model when a predetermined condition to perform cruise driving is satisfied.

10. The diagnostic system according to claim 1, wherein the driving pattern is a driving pattern regulated in a 10-15 mode or a driving pattern regulated in LA#4 mode.

11. The diagnostic system according to claim 1, further comprising:
a torque characteristic model storage unit that stores a torque characteristic model that represents the relationship between a specific engine parameter used in control over the internal combustion engine and a torque of the internal combustion engine;
a data acquisition unit that acquires respective values of the fuel consumption and the torque and rotational speed of the internal combustion engine and a value of the specific engine parameter at an update timing at which the map data are updated; and
an updating torque value generating unit that, when the acquired value of the specific engine parameter differs from a specific value, uses the torque characteristic model to generate an updating value of the torque, corresponding to the specific value, from the acquired value of the torque, wherein
the map data updating unit updates a value of the fuel consumption of the map data, corresponding to the acquired value or generated updating value of the torque and the acquired value of the rotational speed of the internal combustion engine, to the acquired value of the fuel consumption.

12. The diagnostic system according to claim 11, wherein when the acquired value of the specific engine parameter coincides with the specific value, the map data updating unit updates a value of the fuel consumption of the map data, corresponding to the acquired value of the torque and the acquired value of the rotational speed of the internal combustion engine, to the acquired value of the fuel consumption, and
when the acquired value of the specific engine parameter differs from the specific value, the map data updating unit updates a value of the fuel consumption of the map data, corresponding to the generated updating value of the torque and the acquired value of the rotational speed of the internal combustion engine, to the acquired value of the fuel consumption.

13. The diagnostic system according to claim 11, wherein the specific engine parameter is an ignition timing, and the specific value is a minimum advance for best torque.

14. The diagnostic system according to claim 11, wherein the specific engine parameter is an air-fuel ratio, and the specific value is a stoichiometric air-fuel ratio.

15. The diagnostic system according to claim 11, wherein the specific engine parameter is at least one of a fuel injection timing for a direct-injection engine, an EGR rate and a valve timing.

16. The diagnostic system according to claim 11, wherein when a plurality of values of the fuel consumption, corresponding to the same values of the torque and rotational speed of the internal combustion engine, are acquired, the map data updating unit updates the value of the fuel consumption of the map data to a mean value of the plurality of values of the fuel consumption.

17. A diagnostic method for a vehicle that is driven by an internal combustion engine, comprising:
acquiring a diagnostic driving pattern defined by a vehicle speed;
storing a drive train model for calculating a torque and rotational speed of the internal combustion engine backward from a vehicle speed and an acceleration;
storing map data in which a fuel consumption is associated with a torque and rotational speed of the internal combustion engine;
updating the map data on the basis of a result of actual control over the internal combustion engine;
calculating changes in torque and rotational speed of the internal combustion engine when the vehicle is caused to drive in accordance with the driving pattern using the drive train model; and
calculating a fuel efficiency when the vehicle is caused to drive in accordance with the driving pattern using the calculated changes in torque and rotational speed of the internal combustion engine, and the map data.

* * * * *